Dec. 1, 1970  L. ZENERE  3,544,403
METHOD OF MAKING MULTILAYER COMPOSITE DRIVING BELT
Filed Nov. 21, 1967

INVENTOR
Livio Zenere
BY Green, McCallister & Miller
ATTORNEY

United States Patent Office 3,544,403
Patented Dec. 1, 1970

3,544,403
METHOD OF MAKING MULTILAYER COMPOSITE DRIVING BELT
Livio Zenere, Via Margherita 9, Valdagno, Vicenza, Italy
Filed Nov. 21, 1967, Ser. No. 684,869
Claims priority, application Italy, Nov. 21, 1966, Patent 780,202
Int. Cl. B29d 29/00
U.S. Cl. 156—137       3 Claims

ABSTRACT OF THE DISCLOSURE

A method is provided for making multilayer straps or belts particularly adapted for generally fast drives and particularly spinning and twisting machines, wherein a composite fabric is first prepared as formed by coupling or bonding polyamide resin layers, with the addition of an outside layer formed of a double-face fabric, one face of which is formed of plastic material yarns adapted to be adhered or welded to the other layers, and the other face of which is formed of cotton yarns or other insulating fiber having equivalent thermal properties.

---

As is well known, light straps or belts are used in textile machines and particularly for operating spinning and twisting spindles.

As long as such spindles had been rotated through a comparatively moderate speed, cotton fabric straps or belts were used. When the spindles were rotated at a higher angular speed, these driving means suffered from serious drawbacks due to elongation thereof and edge fraying, as well as the difficulty in obtaining a good welding.

Therefore, there were subsequently provided multilayer straps or belts of polyamide resin fabric which were successful when the spindle speed was within 7,000–8,000 r.p.m.

As a rule, a spindle is stopped to reattach a broken yarn by frictioning the strap or belt, this operation involving, of course, a heating due to rubbing friction. Such heating could be endured by the plastic multilayer material straps or belts as far as the rotations were within the above stated range.

When the angular speeds of the spindles were increased, now exceeding 11,000–12,000 r.p.m., rubbing temperature increases occur which compromise the life of the above described plastic multilayer straps or belts owing to distortions they undergo due to the higher heat and resulting wear.

In order to withstand the higher rubbing heating in the above operations, many and accurate researches were effected to devise a belt contruction more suitable to withstand such higher temperatures.

However, this approach to a solution encountered the difficulty of effectively gluing such cotton fabric to the remainder of polyamide resin layers.

The problem was fully solved by forming the layer facing the inner space of the belt with a double-face fabric, one face of which is completely formed of resin yarn, whereas the opposite face is completely formed of cotton yarn, or equivalent thermo-insulating fibers, so that the resin fabric face is adhered or glued to the other layers forming the strap or belt,while the cotton fabric face or the like will contact the driving members. The novel concept of the present invention resides in this approach to a solution, since the straps or belts as obtained in the above described way, have a life ten times that of conventional straps or belts used at the above indicated higher angular speeds (above 10,000–12,000 r.p.m.).

It should be understood that what has been stated about cotton yarn applies to any other natural fiber, which is thermally insulating.

On such a basis, the strap or belt, according to this patent application has been designed and carried into effect.

Figure 1:
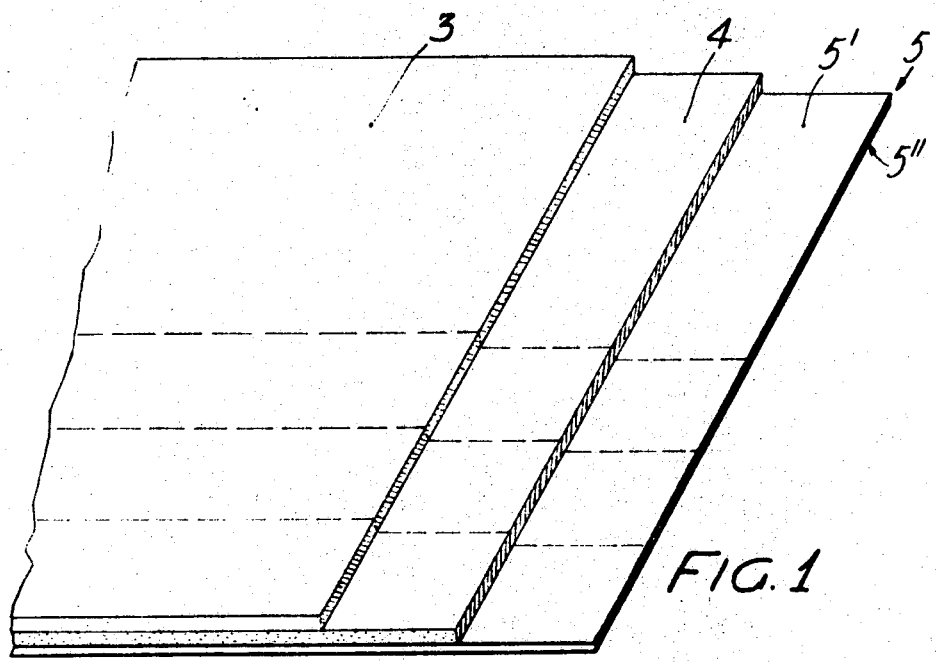
Figure 2:

For sake of clarity the thickness in the schematic accompanying drawings are shown on an enlarged scale for a better view of the steps of the method according to the invention and a portion of a strap or belt thus being obtained. More particularly:

FIG. 1 is a perspective view showing a composite layer made according to the method of the invention; and FIG. 2 is a perspective view showing a portion of a strap or belt made in accordance with the invention.

The method consists of superimposing a foil of polyamide resin 4 to a first layer of polyamide resin fabric 3 and bringing the former into contact with a third layer 5 of double-face fabric, the upper face 5' of which is a polyamide resin, whereas the lower or under face 5" is of cotton.

The beforehand superimposed layers 5, 4 and 3 are pressed and adhered together in a conventional manner to provide a complete and close junction of the elements, thereby obtaining a single composite fabric as a result.

By cutting off strips (see the dash lines of FIG. 1) to the required width from the composite fabric 5, 4, 3, the desired straps or belts are formed. The strips of course shall present the cotton face towards the center or underside of the belt, that is the face or surface adapted to adhere or contact the driving members, which is subjected to frictional heating.

It will be apparent to those skilled in the art that any commercial type of glue or cement for polyamide (nylon) type resin materials may be employed for gluing, securing-adhering or bonding the resin surfaces of the plies or layers together, as well as for securing ends of a formed composite strips into a continuous belt. If welded, pressure and heat may be conventionally used. U.S. Pats. Nos. 2,933,775 2,896,396 and 2,933,755 and British Pat. 755,266 set forth representative heat bonding or welding procedure and representative cementing or bonding materials.

Canadian Pat. No. 706,860 of Mar. 30, 1965 and U.S. Pat. No. 2,993,826 also set forth representative cementing or bonding materials and procedure.

The invention is not limited as to dimensions, numbers of sheets, structure of the several above indicated polyamide resin and cotton fabrics.

The composite fabric is formed of a first upper layer of polyamide resin fabric, at least a second layer formed of a foil of identical polyamide resin, and a third layer of a double-face fabric. The upper face of the fabric of the third layer is intervowen with yarns or fibers of the same polyamide resin, thereby allowing a thorough gluing or welding to an adjoining polyamide layer or foil. The other or lower face of the double face fabric is entirely formed of a cotton fabric or other insulating fiber having equivalent thermal properties; this face is the one which is exposed and faces inwardly of the loop making up the strip or belt. The composite fabric or plural layer strip as thus formed is cut into parallel strips, each strip being of a predetermined length and being closed as a loop with the lower or cotton-like face facing inwardly to contact a spindle or driving members. The strip or belt is thus formed of contracting superimposed and interbonded or closely adhering layers.

I claim:
1. In a method of the character described for making an improved multilayer composite belt that is particularly suited to withstand heat generated by fast spinning and twisting machine drives, providing individual layers of polyamide resin fabric material, superimposing the polyamide resin layers upon each other and upon the resin face of a double-faced layer of fabric material having one face of woven polyamide resin fiber material and an opposite face of an insulating fiber material having equivalent thermal insulating properties of cotton yarn, pressing and adhering the layers together to form a composite plural layer strip, cutting the composite strip into parallel separate strips, and forming each separate strip into a closed belt loop with its insulating fiber face positioned inwardly thereof to provide a contact face for a rotating spindle on which the belt is mounted.

2. In a method as defined in claim 1, providing at least two individual layers of identical polyamide resin fabric material, and employing a double-faced layer whose opposite face is of cotton yarn.

3. In a method as defined in claim 1, applying pressure during the bonding of the three strips together along their abutting resin faces.

References Cited

UNITED STATES PATENTS

| | | | |
|---|---|---|---|
| 2,933,775 | 4/1960 | Siegling | 161—227 XR |
| 2,896,396 | 7/1959 | Kenyon | 57—104 |

FOREIGN PATENTS

| | | | |
|---|---|---|---|
| 755,266 | 8/1956 | Great Britain | 74—232 |

PHILIP DIER, Primary Examiner

U.S. Cl. X.R.

19—151; 57—104; 74—232; 156—157, 304; 161—145, 227

PO-1050
(5/69)

UNITED STATES PATENT OFFICE
CERTIFICATE OF CORRECTION

Patent No. 3,544,403         Dated December 1, 1970

Inventor(s) Livio Zenere

It is certified that error appears in the above-identified patent and that said Letters Patent are hereby corrected as shown below:

SUBSTITUTE CERTIFICATE OF CORRECTION

Column 1, line 55, correct the spelling of "construc same column, after the paragraph ending with "temperatures." in line 56, insert the following paragraph:

--Due to the fact that plastic materials that are suitab: for the above use are not thermally stable, it has been necessa to effectively protect them from heat in order to utilize thei favorable features. It has been finally determined that polyar resin straps and belts, such as subjected to the above mention serious thermal stresses, will withstand such stresses by the application of an insulating cotten fabric layer or other simi: insulating material as applied to the inner face of the strap belt that contacts the spindle.--

Column 2, line 57, correct the spelling of "interwo

Signed and sealed this 13th day of April 1971.

(SEAL)
Attest:

EDWARD M. FLETCHER, JR.         WILLIAM E. SCHUYLER, JR.
Attesting Officer                 Commissioner of Patents